United States Patent
Enders

[11] Patent Number: 6,095,207
[45] Date of Patent: Aug. 1, 2000

[54] SEALING DEVICE FOR A FILLING OPENING AND METHOD FOR ITS CONTROL

[75] Inventor: Walter Enders, Friedberg, Germany

[73] Assignee: Mannesmans VDO AG, Frankfurt, Germany

[21] Appl. No.: 09/108,605

[22] Filed: Jul. 1, 1998

[30] Foreign Application Priority Data

Jul. 9, 1997 [DE] Germany .................. 197 29 267

[51] Int. Cl.⁷ .................................................. B65B 1/04
[52] U.S. Cl. .................. 141/348; 141/4; 141/46; 141/287; 141/348; 141/363; 141/365; 141/368; 141/369; 141/376; 141/391; 220/86.2; 277/605
[58] Field of Search .................. 141/1, 4, 46, 222, 141/287, 348, 363, 365–370, 375, 376, 391; 220/86.2; 277/331–334, 589, 605

[56] References Cited

U.S. PATENT DOCUMENTS

| 4,098,308 | 7/1978 | Purdum | 141/285 |
| 5,247,974 | 9/1993 | Sargent et al. | 141/287 |
| 5,333,653 | 8/1994 | Rzesutock et al. | 141/1 |
| 5,609,190 | 3/1997 | Anderson et al. | 141/59 |

FOREIGN PATENT DOCUMENTS 0484642 5/1992 European Pat. Off. .

Primary Examiner—Henry J. Recla
Assistant Examiner—Timothy L. Maust
Attorney, Agent, or Firm—Martin A. Farber

[57] ABSTRACT

In a sealing device for a filling opening, especially for sealing it against the escape of fuel fumes when filling stationary or mobile supply tanks, a seal is located in the vicinity of the filling opening and abuts in a sealing fashion an object such as a filling device that is inserted into the filling opening. The seal automatically controlled by means of a control unit between an inactive resting position and an active sealing position of the seal. As a result, the seal is protected especially well against damage during insertion or withdrawal of the filling device, and reliable sealing can be expected in the long term.

22 Claims, 3 Drawing Sheets

SEALING DEVICE FOR A FILLING OPENING AND METHOD FOR ITS CONTROL

FIELD AND BACKGROUND OF THE INVENTION

The invention relates to a sealing device for a filling opening, especially for sealing against the escape of fuel fumes when filling stationary or mobile supply tanks, with the features wherein a seal is located in the vicinity of a filling opening and, in its sealing position, abuts an object such as a filling device inserted into a filling opening. The invention also relates a method for control of the sealing device.

It is known that the escape of fuel fumes from the filling opening of the tank (supply tube or filler neck) when filling motor vehicles with fuel can be prevented by mechanically acting sealing arrangements. There are various embodiments.

The seal can be attached to the filling device (often referred to as the gas hose nozzle), whereupon problems arise with adaptation to the model-specific environment of the mouth of the filler neck. Arrangements of this kind are known especially in conjunction with an active emission recovery system at the filling station.

The seal can be located in the filler neck itself, however (according to EP 0 484 642 A1 for example). As the level rises and the internal pressure in the tank increases, any fumes that escape are not guided in a countercurrent through the intake to the outside but through a filter, especially an activated charcoal filter, which traps the fuel components. Occasionally however there are sharp edges on the filling nozzle or the latter is inserted carelessly, so that a static seal on the neck side is liable to be destroyed.

It has also been proposed to solve the problem by employing measures involving flow technology (so-called liquid seal technology), in which a suction flow is generated during filling as the fuel flows into a filler neck with a correspondingly shaped cross section. The pressure drops thus produced are intended to prevent fumes from escaping without using actual seals. It has been found however that such arrangements are cumbersome and expensive because they must be carefully adapted to each individual filling system design, and proper filling of the tank is made more difficult or at least slowed down.

SUMMARY OF THE INVENTION

The object of the invention is to provide an improved sealing device that is less prone to damage, for a filling opening of this kind as well as a method for its control.

This object is achieved according to the invention wherein the seal is controllable automatically by means of a control unit back and forth between an inactive resting position and an active sealing position.

The sealing device comprises an actively controllable seal inside the filling opening and/or filler neck, which is controlled to assume its operating or sealing position only when necessary, i.e. when the filling device has been introduced and/or the internal pressure in the tank has increased, and otherwise remains in an inactive resting position or an introduction/removal position in which it is secure against damage.

The beginning and end of the filling process are preferably detected automatically by suitable switching elements in the vicinity of the filling opening. A control unit senses and coordinates the various switch signals and controls the active seal in accordance with their measurements. When the cap is removed from the filling opening, the active seal, according to one improvement, can initially be brought automatically into a specific resting position in which it is protected against premature contact with the filling nozzle. This process is preferably detected by a first switch element and passed on by signal to the control unit.

The presence of the filling device in the filling position can be detected by a second switch element (electromechanical switch, zero contact sensor) which can be associated for example with a so-called lead-free valve. The latter, as is known, is opened by the filling device upon complete introduction. This switch element is also connected to the control unit. Its switch signal during or after the introduction of the filling device or of the filling tube of a canister causes the activation of the active seal.

As the fuel flows in, the internal pressure in the gas chamber of the tank above the surface of the fuel increases relative to the resting state. The fumes above the fuel are now forced through the activated charcoal filter. During this time, the active seal remains in its sealing position. Preferably an internal pressure or differential pressure sensor is provided in the tank and is connected to the control unit, supplying the latter with a signal that varies as a function of the internal pressure in the tank or of the outward gas flow.

As is known, the tank must be supplied with air during the removal of the fuel so that this process is not disturbed by the formation of a vacuum. On the one hand, the internal or differential pressure signal makes it possible to switch from this supplying of air to venting the tank during filling. A switchable valve is provided for this purpose, with a 3/2-way design for example.

During the filling of the tank, the internal or differential pressure signal that differs from the normal state can also produce a redundant control for the active sealing position.

Another option for redundant control of the active sealing position can be obtained by evaluating the increase in the fullness of the tank. As is known, conventional fuel tanks have a fullness indicator, usually electrical, whose signal changes in proportion to the rise in the level of the liquid. In conventional vehicles, this device is inactive when the main switch is turned off and therefore normally does not operate during the filling process. If, after corresponding modifications, it delivers a "level rising" signal to the control unit, this can also result in activation of the active seal independently of, or redundantly with, the above control options because it follows the internal pressure curve (a significant pressure change relative to the normal level takes place when the level rises rapidly).

When the filling process is terminated, on the other hand, the internal pressure falls through the vent passages and/or the activated charcoal filter back to atmospheric pressure and/or any differential pressure in the outflow channel disappears. The output signal from the internal pressure sensor thus undergoes a significant downward change because the rise in the level signal comes to a halt.

Below a certain signal threshold, a control signal is derived to return the active seal to its specified resting position. The filling device and/or the filling tube can now be pulled out of the filling opening and the cap is replaced.

This signal threshold must be defined so that no gas expulsion caused by overpressure, or at most an amount that is very small, can be expected at the moment the filling device or the filling tube is released by the active seal. A search is made for a compromise for the time interval between the end of the filling process and the release of the filling device so that the user does not have to wait an unacceptably long time and may possibly damage the seal by withdrawing prematurely.

Alternatively, or by way of redundancy, the end of the upward change in the level signal or the disappearance of the differential pressure signal of the outward gas flow can also be used to switch off the active seal.

In an especially preferred and simple design, the latter consists of at least one preferably pneumatically inflatable tube in the shape of a ring that is located in the internal mouth wall area of the filling opening, and abuts the filling device in the inflated, active state. By means of its sealing action, this design also produces at least positive securing of the filling device in the axial direction, in other words against inadvertently falling or pulling out.

A pneumatic seal of this design can be operated by an electrical dual-pressure pump. Pumps of this kind are provided in many vehicles in any event, as part of a pneumatic central locking system for example. When the seal is pre-tensioned flexibly and/or (self-)elastically in its resting position, a pressure pump is also sufficient to activate it. Of course, a liquid pressure could also be built up in the seal in a suitable environment.

The retaining function of the active seal can be extended even further by a mechanical locking of the filling device as a further option if the latter, for example, has a counterbearing close to its mouth behind which a lock or the like can grip. In this way, premature withdrawal or falling out of the filling device is completely prevented and risk of damage to the seal is minimized. This lock is also automatically pushed in and/or reset for example by means of the dual-pressure pump. The determination of the filling level of the tank remains a task for the user since the filling device, as already mentioned, is released as soon as the level in the tank is no longer rising and/or its internal pressure drops once again to the normal level. Each filling operation can be deliberately interrupted at any time and the filling device withdrawn again. If necessary, an additional release capability for the seal can be provided (a switch or valve in the vicinity of the filler neck).

The automatic control disclosed here merely prevents the user having to employ certain deliberate sealing measures. It requires only the usual care in introducing the filling device.

It is also possible to provide additional mechanical protection for the seal when it is in the resting position. This can be provided, for example, behind or under a collar that is sufficiently wide to pass through the filling device. However, it can also be located in a circumferential widening of the filler neck over whose internal circumference it projects only in the active sealing position. The active seal can be located upstream or sufficiently far away downstream to avoid mutual collisions of the lead-free valve, with the latter in the second case forming the abovementioned protective device itself. In such a design, the active return of the seal to the resting position prior to the insertion of the filling device can even be eliminated.

BRIEF DESCRIPTION OF THE DRAWINGS

The function and further details and advantages of the subject of the invention as well as the description of the corresponding control method follow from the drawing showing embodiments and the detailed description that follows.

The following are shown simplified.

DETAILED DESCRIPTION OF THE PREFERRED EMBODIMENTS

Figure 1:
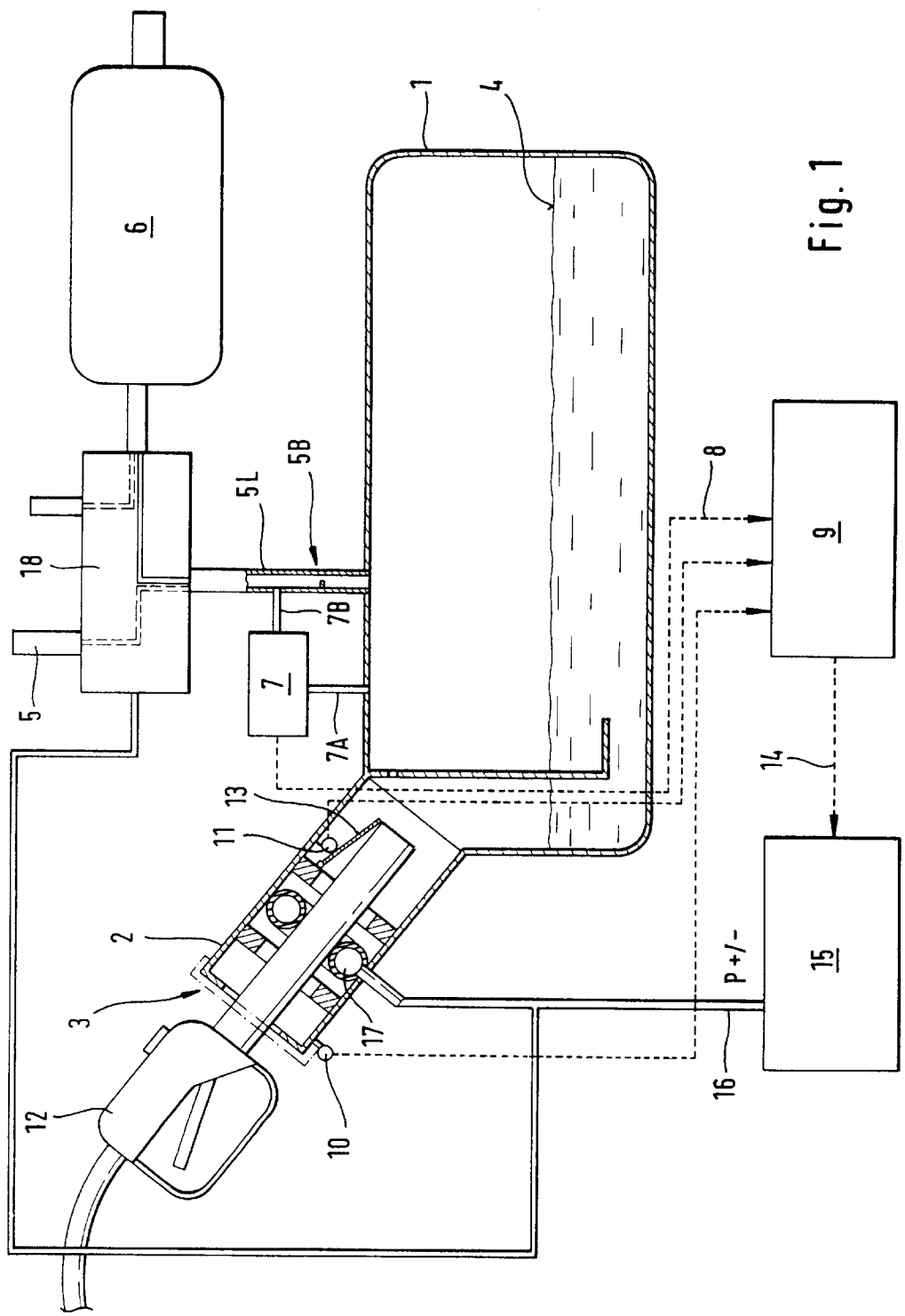
FIG. 1 is a fuel tank arrangement in a vehicle, with a schematic overall diagram of the sealing device and its control.

According to FIG. 1, a fuel tank system comprises a container or tank 1, here shown partially filled, and a filling tube (a filler neck) 2 with a filling opening 3. The internal pressure of the tank 1 that prevails in the gas chamber above the surface 4 of the liquid is normally at atmospheric level because this gas chamber is connected with the ambient air through a line 5L and an operating ventilation system 5 as well as an activated charcoal filter 6.

To detect internal and/or differential pressure changes in tank 1, a pressure sensor 7 is provided. Its electrical output signal, which changes as a function of the internal pressure, is supplied through a line 8, shown as a dotted line, to a control unit 9. The latter is provided in particular for controlling the active sealing device of the filling opening. It can be provided as a separate module for this purpose or it can also be a preferably modular component of the (electronic) central control unit which is usually provided in any case nowadays in motor vehicles.

In the vicinity of filling opening 3, another switch element 10 is provided that generates a signal as a function of the position of a container cap or tank cap and is likewise connected through a line, shown as a dotted line, to control unit 9. Downstream from this switch element 10, another switch element 11 is provided in feed line 2 that must detect the introduction of a filling device 12 into filler neck 2. Its output signal is also supplied through a line, shown as a dotted line, to control unit 9.

Switch elements 10 and 11 can be designed as electromechanical contact switches that cooperate with the tank cap and/or the "lead-free valve" 13 indicated here. However they can also be made as sensor types that operate with zero contact (inductive, capacitive, and infrared switches) or as types that are otherwise suitable for the stated purpose. In particular, they can also be combined into a module instead of the separate arrangement shown here for the sake of clarity.

For the embodiment shown here, an electrical dual-pressure pump 15 is connected to an output 14 of control unit 9. At its pneumatic connection 16, this pump alternately produces a pressure or a vacuum (represented by P+/−). An active seal 17 that is annular and abuts its inside wall is provided in filler neck 2, said seal preferably being designed as an inflatable rubber-elastic tube made of a fuel-resistant, mechanically resistant material. The interior of seal 17 is connected to connection 16 of dual-pressure pump 15. Finally, a switchable switching valve 18, pneumatic in this case (functionally a 3/2-way valve) is connected downstream of the connection of the dual-pressure pump 15, parallel to seal 17.

During the filling process, valve 18 must shut off the vent 5 of the tank and connect its interior and/or gas chamber with the activated charcoal filter 6.

The valve 18 can also be made as a solenoid valve that can be activated or switched directly electrically by the control unit 9. In any event, it must preferably be made to be self-resetting so that the air supply to tank 1 is switched on when it is in its resting position.

As another variation, a controllable pressure-maintaining valve (not shown) can be connected between the pneumatic output 16 of the dual-pressure pump 15 and the seal 17, so that the pump 15 does not have to run continuously throughout the entire filling process to maintain the pressure in the seal.

At the end of the filling process, this pressure-retention valve must be capable of being controlled for example by a vacuum from the dual-pressure pump or by an electrical pulse from the control unit, so that the active seal 17 can be released as intended.

By means of a venting of the filler neck 2 near the seal, not shown in greater detail (retracted into the tank and/or the activated charcoal filter), assurance is provided that the liquid level can rise in it and influence the automatic shutoff of the filling nozzle.

Figure 2:
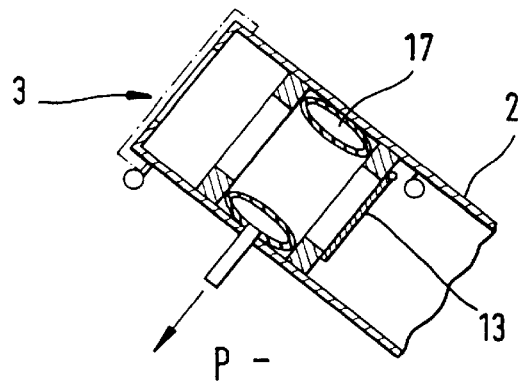
FIG. 2 comprises FIGS. 2a, 2b, 2c and shows several phases of the positioning of the sealing device during the filling process.
Figure 2:
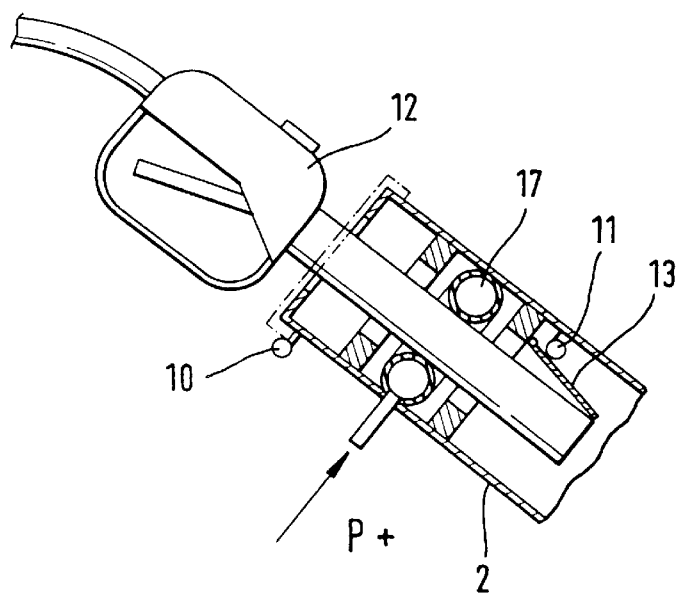
Figure 2:
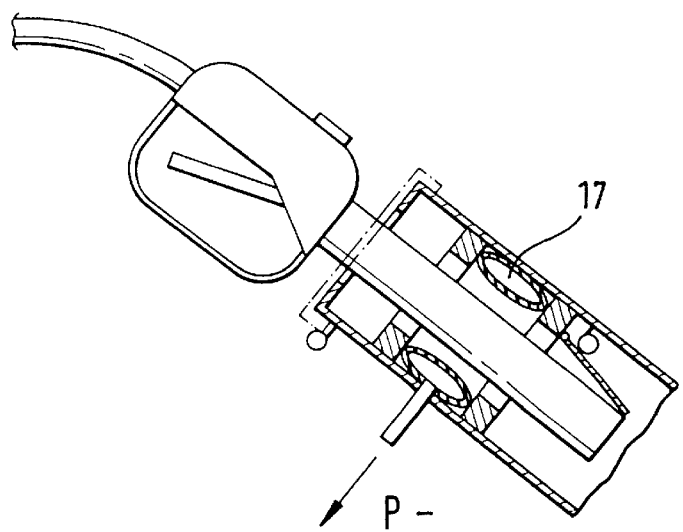

The phase diagram in FIG. 2 will now be used to explain the function and control of this sealing device.

In FIG. 2a shows the moment after the opening of the filler neck and/or removal of the tank lid. A switch element 10 has conducted this process by signal to the control unit 9. The latter switches the dual-pressure pump 15 to generate a vacuum. The active seal 17 is evacuated by the vacuum, indicated by an arrow pointing away from the seal and P−, and largely kept out of the space inside the filler neck. Then the filling device can be introduced without difficulty while the seal remains protected as well as possible against damage.

In the subsequent "active" phase, of FIG. 2b the filling device 12 has already been inserted and has opened the lead-free valve 13. This process is detected by the switch element 11 and passed on by signal to the control unit 9. The latter switches the dual-pressure pump 15 to generate a pressure, whereupon the active seal 17 is filled with air as indicated by an arrow pointing toward it and P+, expands, and fills the annular gap between the inside wall of the filler neck 2 and the jacket surface of the filling device 12 in a sealing manner.

At the same time, by activation of the switch valve 18, the activated charcoal filter 6 is connected with the gas chamber of the tank 1. When the filling process begins, the liquid level 4 rises. The pressure inside the tank increases because of the throttling effect of the filter. This is detected by the pressure sensor 7 and supplied by signal to the control unit 9.

The latter can store the increased pressure level temporarily for example and constantly compare it with the current sensor output value. The rising switch flank of the sensor signal can also be evaluated directly. The active phase b) with the seal applied lasts until the pressure sensor 7 detects a definite drop in the internal pressure and/or the differential pressure.

The control unit 9 interprets the fallen pressure value and/or the negative switch flank of the sensor signal to mean that the filling process has been ended. Switch thresholds for the pressure values are defined so that temporary interruption of the filling process (by premature automatic shutoff of the filling device for example) does not lead to immediate release of the filling device or retraction/emptying of the seal. The pressure changes in the tank take place relatively gently because of the throttling effect of the filter 6 and the good seal at the filling tube so that reliable functioning of the pressure control can be expected.

When the internal pressure has once again dropped to atmospheric level or less upon the termination of the filling process, the control unit 9, because of the change in signal from the pressure sensor 7 according to phase c), activates the dual-pressure pump 15 once more to generate a vacuum (P−, arrow pointing outward). At the same time, the switch valve 18 is returned to its resting or basic position in which the gas chamber of the tank 1 communicates with the outside air through the vent 5.

If the abovementioned pressure-maintenance valve is provided, it must naturally be controlled before the internal pressure of the seal 17 falls and the filling device 12 can be retracted.

In contrast to the design explained above, instead of the (absolute) internal pressure sensor, a pressure differential measurement can also be used to control the seal. As a result of the fuel flowing in, as mentioned above, air is forced out of the tank. This outward flow can generate a differential pressure (detectable here by the connections 7A and 7B of the sensor 7) at a diaphragm 5B in the line 5L or directly at the activated charcoal filter. The corresponding signal from the sensor can be evaluated as a hold signal for the seal. If the differential pressure disappears at the end of the filling process, the seal will be restored to its resting position, possibly with a slight delay.

The active evacuation and/or return of the seal 17 can be avoided if the seal is pretensioned in its resting position and automatically returns or collapses into its resting position when the delivery pressure from the pump is shut off. In the case of a thick-walled tubing material, which is preferable in any case because of its mechanical resistance, suitable pretensioning can be provided by intrinsic elasticity and/or internal pretensioning.

Finally, it should be noted that one of the switch elements 10 or 11 or both of them are mounted hierarchically as main switches for the activation of the active parts of the sealing device so that when the tank cap is shut for example, the entire system is switched passively and unnecessary controlling of the seal can be practically excluded.

Figure 3:
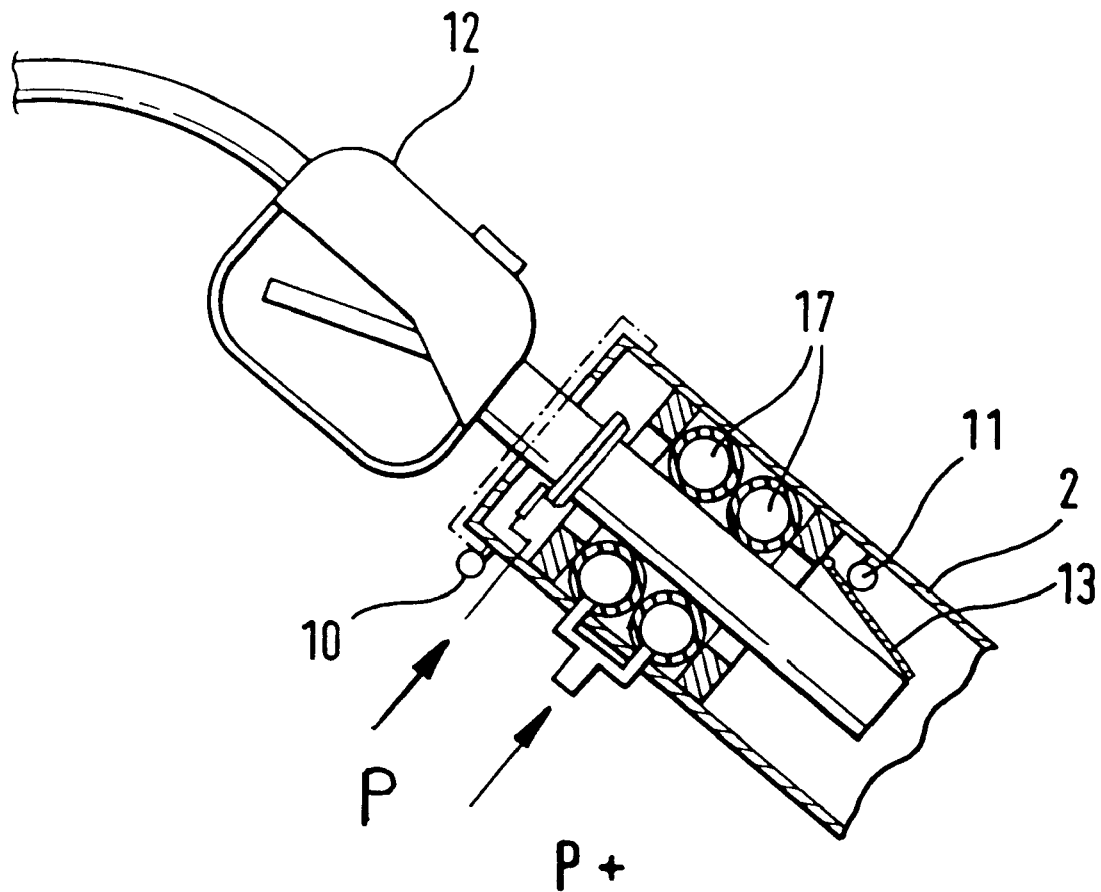
FIG. 3 is another version of the design for the active seal.

Finally, FIG. 3 shows an embodiment of the seal 17 as a double or tandem tube in which two tubes are arranged with a space between them at the inside wall of the filler neck. The representation corresponds to active phase b) in FIG. 2. This solution provides even better mechanical retention and a greater sealing effect.

Although the invention has been described here with reference to the situation in motor vehicles, the subject can of course also be used for filling stationary tanks from a tank truck.

I claim:

1. Sealing device for a filling opening of a tank, suitable for sealing the opening against the escape of fuel fumes when filling a stationary or mobile tank, the filling opening connecting via a filling tube to the tank, comprising:

a seal located in the vicinity of the filling opening and being positioned in the filling tube between the filling opening and the tank, the seal having a sealing position wherein the seal abuts an object, including a filling device inserted into the filling opening;

a first sensor of a position of the filling device between the filling opening and the seal, a second sensor of a position of the filling device between the seal and the tank; and a control unit for automatically controlling the seal between an inactive resting position in response to a signal of the first sensor and an active sealing position in response to a signal of the second sensor, wherein, in the active sealing position, the seal enlarges to contact the filling device and, in the inactive sealing position, the seal retracts to clear the filling tube.

2. Sealing device according to claim 1, further comprising:

a pressure sensor that detects the internal pressure of the tank above a level of liquid in the tank, and is connected to said control unit for controlling said seal.

3. Sealing device according to claim 1, further comprising:
a sensor provided with two terminals for detecting a differential pressure generated by an outward flow of gas from the tank, the sensor being connected to said control unit for controlling said seal.

4. Sealing device according to claim 1, further comprising:
a level sensor that detects a level of liquid in the tank, and is connected to said control unit for controlling said seal.

5. Sealing device according to claim 1, further comprising:
a counterbearing provided on the filling device, and a mechanical lock which secures the counterbearing positively during activation of said seal.

6. Sealing device according to claim 1, wherein the first sensor comprises a switch element connected to the control unit and being located in the vicinity of the filling opening for detecting a filling process and for generating a switch signal in response to detection of the filling process.

7. Sealing device according to claim 6, wherein the first sensor is located in the vicinity of the filling opening for detecting an opening of the filling opening.

8. Sealing device according to claim 6, wherein the first sensor is located in the vicinity of the filling opening for detecting an insertion of the filling device.

9. Sealing device according to claim 6, wherein the first and the second sensor comprise first and second switch elements, said two switch elements being combined into one module.

10. Sealing device according to claim 1, wherein said seal comprises at least one inflatable tube, and is arranged annularly in the filling opening at its inside wall.

11. Sealing device according to claim 10, wherein there are at least two of said inflatable tubes, said two tubes being arranged in tandem to form said seal.

12. Sealing device according to claim 10, wherein said seal is automatically adjustable by internal pretensioning into its resting position.

13. Sealing device according to claim 1, further comprising:
a mechanical protective device for said seal, said protective device being located in the vicinity of the filling opening, said seal being retractable into the resting position behind an internal circumference of said protective device.

14. Sealing device according to claim 13, wherein said protective device comprises a circumferential collar located upstream of said seal, and having an opening width that is sufficient for passage of a filling device therethrough.

15. Method for controlling a sealing device in the filling opening of a tank, the filling opening connecting via a filling tube to the tank, comprising steps of:
providing a control unit and a switching arrangement connected to the control unit for detecting a filling process of the tank;
providing an active seal in the filling tube between the filling opening and the tank;
controlling the seal by said control unit, as a function of signals from said switching arrangement, back and forth between an inactive resting position and an active operating or sealing position, the switching arrangement being operative to provide first signal of a position of a filling device in the filling tube between the filling opening and the seal and to provide a second of a position of the filling device between the seal and the tank;
wherein said control unit controls the active seal into its active sealing position in response to the second signal following opening of the filling opening detected by the switching arrangement and upon complete insertion of the filling device into the filling opening.

16. Method for controlling a sealing device in the filling opening of a tank, comprising steps of:
providing a control unit and at least one switch element connected to the control unit for detecting a filling process of the tank;
providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening;
when the filling opening opens, generating a first switch signal and, in response to said first switch signal, controlling said active seal by said control unit to occupy a resting position of said active seal;
during or after the insertion of the filling device into the filling opening, generating an additional switch signal and in response to said additional switch signal, controlling said active seal by said control unit to occupy its active sealing position; and
when an elevated internal pressure that prevails in the tank during filling falls below a predetermined threshold value and/or following the end of a rise in the liquid level and/or following a disappearance of a differential pressure generated by an outward flow of gas, generating an additional signal that causes said control unit to return said active seal to its resting position.

17. Method for controlling a sealing device in the filling opening of a tank, comprising steps of:
providing a control unit and at least one switch element connected to the control unit for detecting a filling process of the tank;
providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening;
providing a switching valve to be controlled by said control unit during a period of time that said active seal is in the sealing position; and
operating said valve to disconnect a gas chamber of the tank from an operational air supply and connecting the gas chamber to a vent with filtration of exhausted air.

18. Method for controlling a sealing device in the filling opening of a tank, comprising steps of:
providing a control unit and at least one switch element connected to the control unit for detecting a filling process of the tank;

providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening; and operating a pump to deliver at least a positive pressure which is controlled to urge the seal, in the form of at least one inflatable tube, to adopt the sealing position.

19. Method for controlling a sealing device in the filling opening of a tank, comprising steps of:

providing a control unit and at least one switch element connected to the control unit for detecting a filling process of the tank;

providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening;

indicating a pressure change in the gas chamber of the tank by a pressure signal; and evaluating the pressure signal in said control unit to reset said seal to its resting position before a withdrawal of the filling device.

20. Method for controlling a sealing device in the filling opening of a tank, comprising steps of:

providing a control unit and at least one switch element connected to the control unit for detecting a filling process of the tank;

providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening; and evaluating a drop in an internal pressure of the tank below a predetermined threshold value that is slightly above atmospheric pressure, and resetting said seal.

21. Method for controlling a sealing device in the filling opening of a tank, comprising steps of:

providing a control unit and at least one switch element connected to the control unit for detecting a filling process of the tank;

providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening;

connecting a differential pressure sensor to said control unit for sensing differential pressure of a diaphragm in a gas outlet of the tank, and evaluating a disappearance of a signal from said differential pressure sensor to reset said seal to its resting position.

22. Method for controlling a sealing device in the filling opening of a tank, comprising steps of:

providing a control unit and at least one switch element connected to the control unit for detecting a filling process of the tank;

providing an active seal and controlling the seal by said control unit, as a function of signals from said at least one switch element, back and forth between an inactive resting position and an active operating or sealing position, wherein said control unit controls the active seal into its active sealing position following opening of the filling opening detected by the switch signals and upon complete insertion of a filling device into the filling opening;

providing a sensor of a level of liquid within the tank, the sensor outputting a level signal to said control unit; and evaluating a transition of the signal of the level sensor from a rise to a stop to reset said seal to its resting position.

* * * * *